Oct. 30, 1923.
A. I. NICHOLSON
1,472,613
HYDRAULIC GEAR FOR THE CONTROL OF ENGINE VALVES
Filed Aug. 10, 1920 6 Sheets-Sheet 2
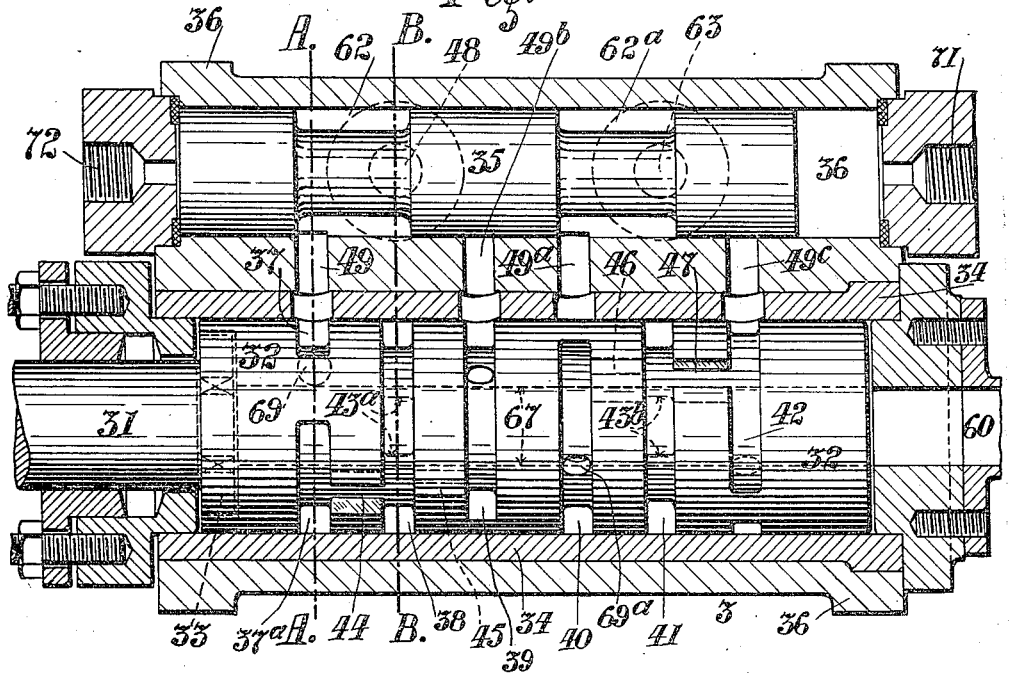
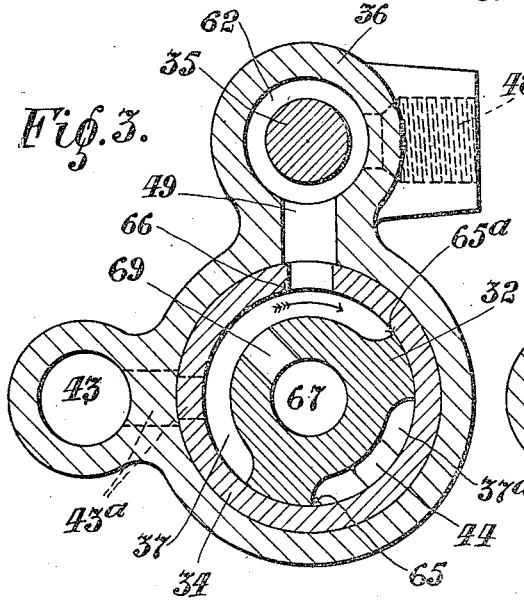
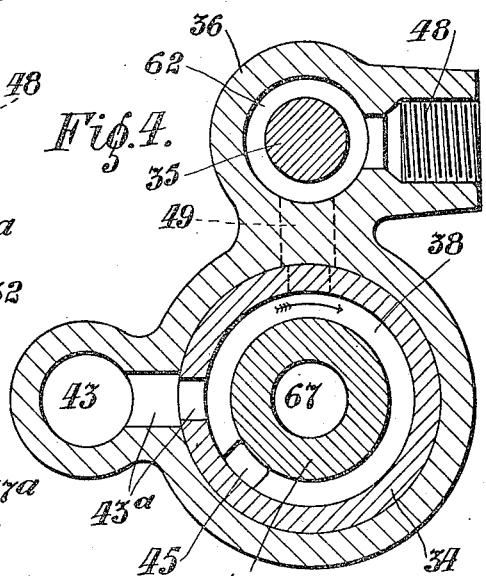

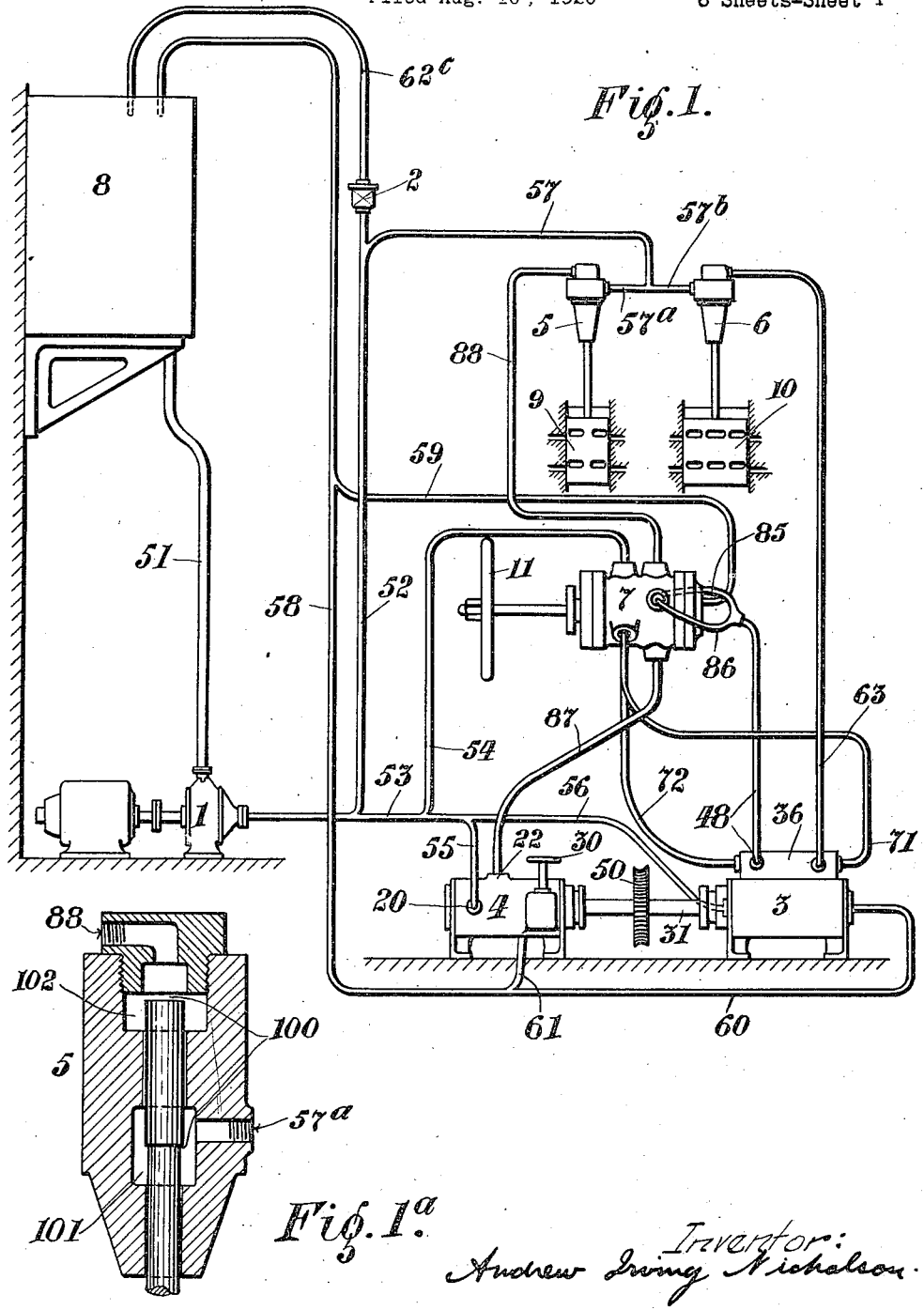

Oct. 30, 1923.  1,472,613
A. I. NICHOLSON
HYDRAULIC GEAR FOR THE CONTROL OF ENGINE VALVES
Filed Aug. 10, 1920   6 Sheets-Sheet 3
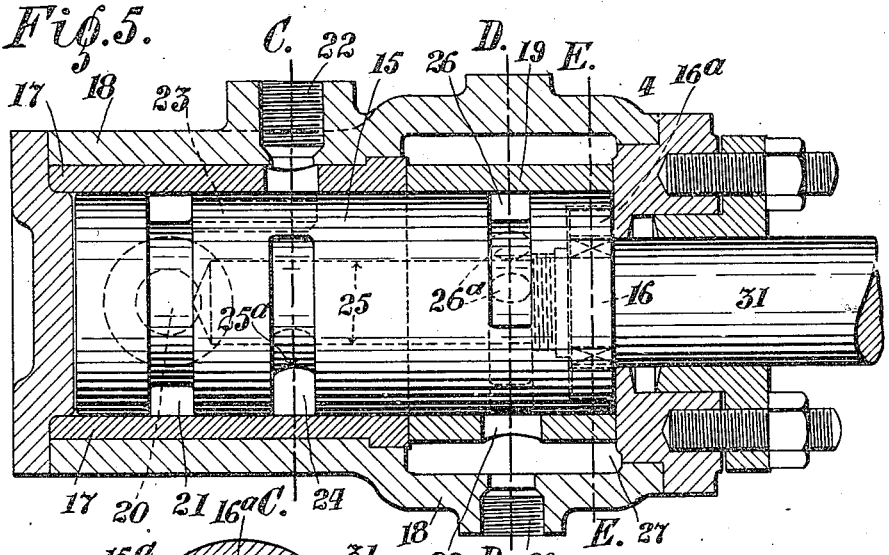
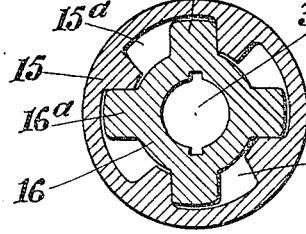
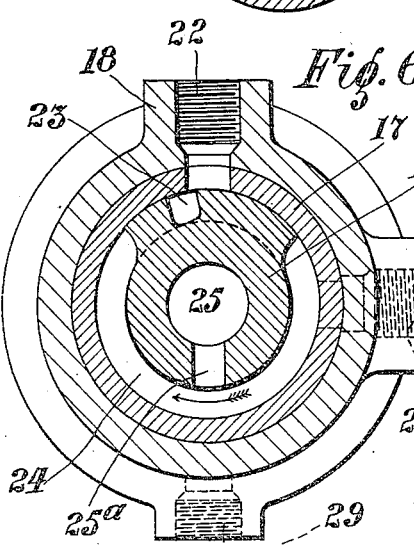
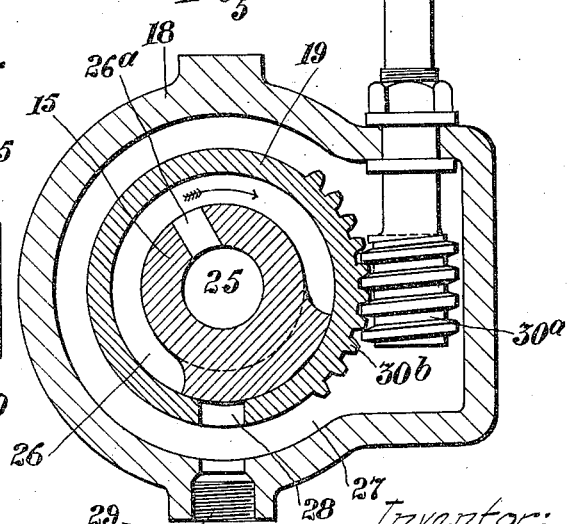
Inventor: Andrew Irving Nicholson Oct. 30, 1923.  
A. I. NICHOLSON  
1,472,613  
HYDRAULIC GEAR FOR THE CONTROL OF ENGINE VALVES  
Filed Aug. 10, 1920 6 Sheets-Sheet 4

Inventor:  
Andrew Irving Nicholson  
By  
Thiedersheim Fairbanks.  
Attorneys.

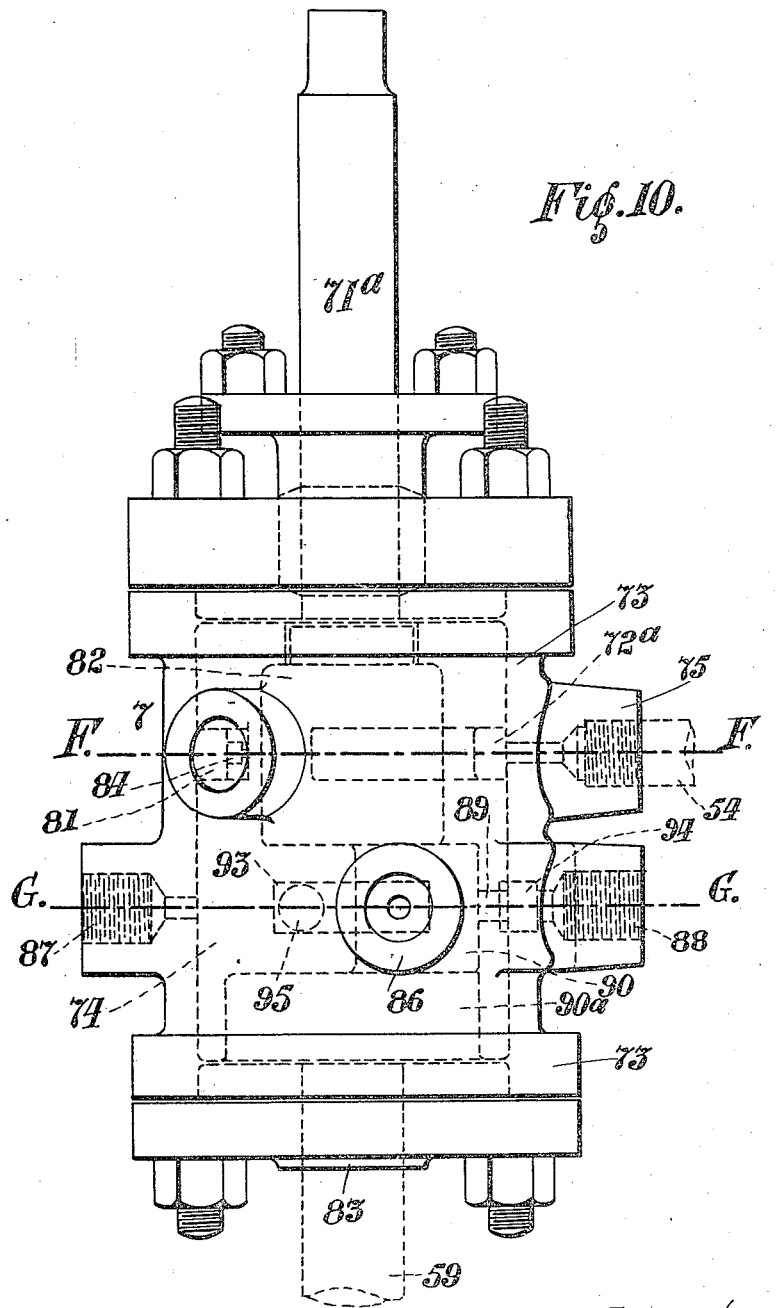

Oct. 30, 1923. 1,472,613
A. I. NICHOLSON
HYDRAULIC GEAR FOR THE CONTROL OF ENGINE VALVES
Filed Aug. 10, 1920 6 Sheets-Sheet 6
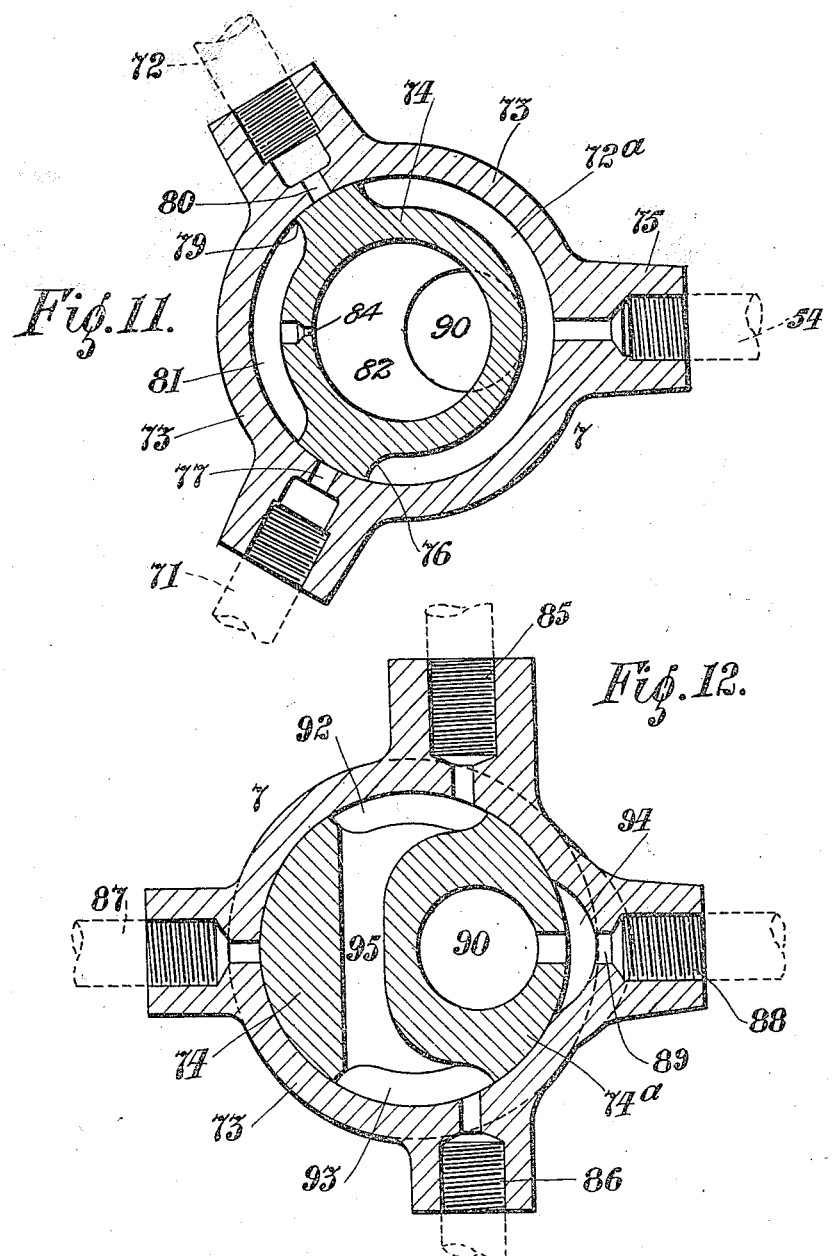

Patented Oct. 30, 1923.

1,472,613

UNITED STATES PATENT OFFICE.

ANDREW IRVING NICHOLSON, OF GREENOCK, SCOTLAND, ASSIGNOR TO SCOTTS' SHIP-BUILDING & ENGINEERING COMPANY, LIMITED, OF GREENOCK, SCOTLAND.

HYDRAULIC GEAR FOR THE CONTROL OF ENGINE VALVES.

Application filed August 10, 1920. Serial No. 402,583.

*To all whom it may concern:*

Be it known that I, ANDREW IRVING NICHOLSON, of 62 Ann Street, Greenock, Scotland, a subject of the King of Great Britain, have invented a certain new and useful Improved Hydraulic Gear for the Control of Engine Valves, of which the following is a specification.

This invention relates to liquid or so called "hydraulic" gears for the control of engine valves. It is known, in such control gears, to employ an oil pump which supplies oil under pressure to one or more distributors which latter operate in such manner as to actuate the engine valves as required.

The object of the present invention is to provide an improved hydraulic control gear which embodies the features of simplicity of construction, convenience in erection and smallness in size. The liquid used is preferably oil.

With the present invention the supply valve of the engine is operated by a device which has a differential working piston acted on by a, primary, constant supply of pressure liquid from a pump, the pressure liquid maintaining the valve closed, or, after being opened, automatically moving it back again to the closed position and also acted on by a, secondary, variable supply of pressure liquid which is under control and, when turned on, opens the valve and, when drained away, allows the valve to close by the automatic action of the primary pressure liquid. The exhaust valve of the engine is operated in the same manner.

I, under this invention, provide means whereby the secondary pressure liquid can be effectively controlled by means of distributors of special construction and a control valve so arranged as to give the following advantages viz:—

Easy reversal of the engine, a long period of steam admission when starting the engine, in either direction: any desired period of steam admission for ordinary running, in either direction: and variation of the steam admission period, by hand, when the engine is running ahead.

The apparatus used also gives a simple and easy control of all the operations required to start, stop, and reverse the engine and provision whereby each operation must follow in the correct sequence.

The drawings annexed show, by way of example, one convenient form or arrangement of the gear which is specially suitable for controlling the supply and exhaust valves of a steam engine.

Fig. 1 shows diagrammatically the general arrangement of the hydraulic gear.

Fig. 1ª is an enlarged sectional view of the device 5.

Fig. 2 is a longitudinal section of the distributor 3.

Fig. 3 is a vertical cross section thereof on the line A—A.

Fig. 4 is a vertical cross section thereof on the line B—B.

Fig. 5 is a longitudinal section of the distributor 4.

Fig. 6 is a vertical cross section thereof on the line C—C.

Fig. 7 is a vertical cross section on the line D—D.

Fig. 8 is a section of the coupling 16, taken on the line E—E.

Fig. 10 is a view of the control box.

Figs. 11 and 12 are sections thereof on the lines F—F and G—G, respectively.

Referring to the drawings:—

Figure 9:
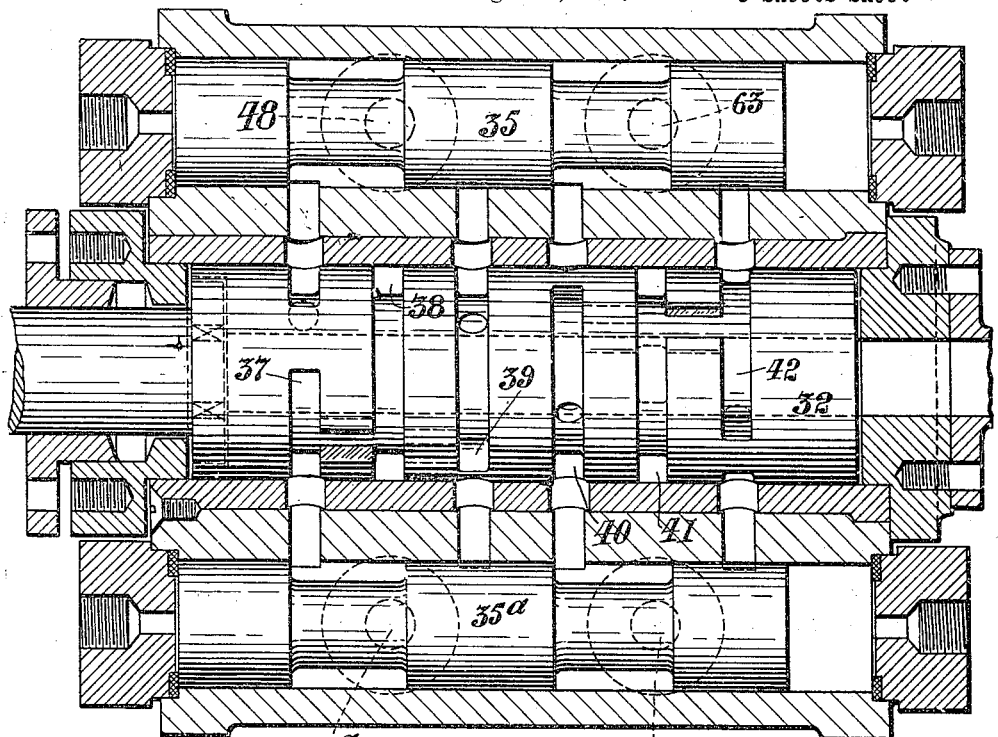
Fig. 9 is a section of a modified form of distributor.

The pump 1 delivers the liquid, preferably oil, to the different portions of the gear at a pressure, kept approximately constant by a relief valve 2, or by a control gear at the pump. 9 is the steam supply valve of the engine and 10 is the exhaust valve thereof.

The pipes 52, 57, give the constant primary supply of pressure liquid to the valve operating devices 5, 6, whilst the two distributors 3 and 4 serve to control the secondary supply to the devices 5 and 6. A control valve 7 is used to start, stop, and reverse the engine. An oil supply and drain tank 8, is provided above the operating cylinders so that the gear may always be kept charged with oil when the pump or the engine is stationary.

The device 5, for operating the steam valve 9, is shown in section at Fig. 1ª and it will be seen it has a differential piston 100 for operating the valve spindle. Primary pressure liquid is supplied constantly to the space 101 by the pipe 57ª and secondary liquid is admitted to space 102 as required for the operation of the valve spindle by the pipe 88. The device 6 for the exhaust valve 10 is similar, the primary pressure liquid being supplied by the pipe 57<sup>b</sup> and the secondary liquid by the pipe 63.

Primary pressure liquid is maintained in the pipe 57 and branches 57<sup>a</sup>, 57<sup>b</sup>, to move the valves 9, 10 in one direction and secondary pressure liquid admitted by pipes 88, 63, when it is required to move the valves in the opposite direction and it is the function of the distributors 3, 4, to regulate this secondary liquid supply and exhaust and of the valve 7 to control the whole operation and action.

The arrangement of the pipe connections are shown clearly in Fig. 1, where the pipe 51 supplies oil, to the pump from the oil tank 8 and the pump supplies oil, under pressure, to the pipes 52, 53, 54, 55, 56, and 57. The pipes 58, 59, 60, 61, and 62<sup>c</sup> are returns.

Referring to Fig. 1 and Fig. 2, the oil supply pipe 54 is led to the casing of the control valve 7 from the pump and, by moving the control wheel 11, this pressure oil may in the manner hereinafter described, be passed either by pipe 71 or pipe 72 to one end or other of the valve cylinder 36 of the distributor 3 in order to actuate the reversing piston valve 35. In the position shown in Fig. 2, the pump will maintain oil pressure on the right hand end of the valve 35 while the end 72 of the cylinder will be connected by means of the control 7 and drain pipe 59 to the tank 8.

The control 7 (see Figs. 10 to 13) consists of a casing 73 into which a cylindrical plug 74 fits, the plug being rotated by a spindle 71<sup>a</sup> to which the hand wheel 11 is attached.

Figure 13:
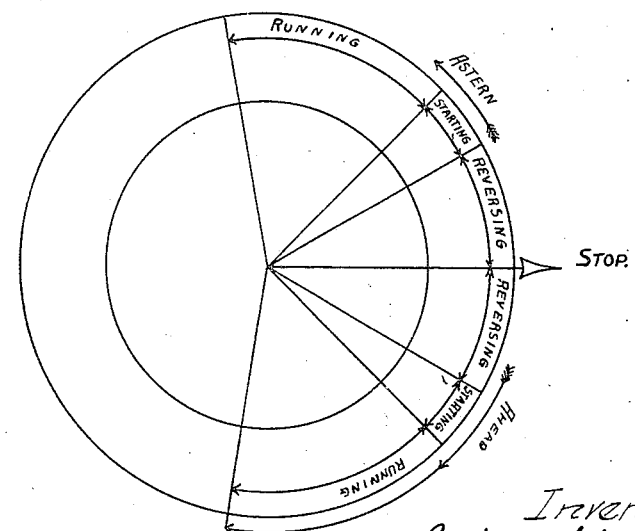
Fig. 13 is a view showing the mode of operating the control.

Oil from the pump 1 and pipe 54 is admitted to the control valve casing by the branch 75 and passes into the groove 72<sup>a</sup> of the plug and, on the rotation of the plug by turning the hand wheel 11 to the right, from "stop" position as indicated in Fig. 13, the edge 76 of the plug uncovers the hole 77 and allows the oil to pass by pipe 71 to the right hand end of the piston valve cylinder 36 (see Fig. 2). At the same time the edge 79 of the groove 81 uncovers the hole 80 and allows exhaust oil to pass away from the left hand end of cylinder 36 by pipe 72, hole 80, groove 81, port 84, space 82 in the plug, drain hole 90, space 90<sup>a</sup> (Fig. 10) and branch 83 and pipe 59 connected thereto and to the tank 8, thereby allowing the piston valve 35 to move, owing to the oil pressure at 71, to the left, or, if it already is in that position, to remain there. In this position the ahead ports 49, 49<sup>a</sup>, are uncovered and the reverse ports 49<sup>b</sup>, 49<sup>c</sup>, closed. The port 84 is restricted in area so that the piston valve 35, Fig. 2, is not moved too quickly either to the right or to the left hand by the movement of the control wheel 11.

If the control wheel be moved to the left from "stop" as indicated in Fig. 13, the oil from the pump will pass from pipe 54 by groove 72<sup>a</sup> and hole 80 to the pipe 72 and left hand (Fig. 2) of the piston valve 35. Simultaneously the pipe 71 will be put in communication with the drain 90 by the holes 77, 84, and spaces 81 and 82. The piston valve 35 will now be forced to the right (Fig. 2) and the ahead ports 49, 49<sup>a</sup>, will be covered up whilst the reverse ports 49<sup>b</sup>, 49<sup>c</sup>, will be uncovered.

In this way it will be seen the upper part of plug 74 of the control valve controls the action of the piston valve 35 of the distributor 3.

Referring now to the distributors 3 and 4 these are both driven from the main engine crank shaft through worm gear 50, or other gearing, at a speed to suit the requirements of the valves to be operated. For example, if the valves are to operate once for each revolution of the engine, the rotary speed of the distributors will be equal to the speed of the main engine shaft. If the valves are to operate once for every two revolutions of the main engine, the speed of the distributors will be half the speed of the main engine shaft and so on.

The distributor 3 serves to control the secondary oil supply and exhaust by pipe 63 of the device 6 for operating the exhaust valve 10 and it also controls the secondary oil supply and exhaust by pipes 48, 88, to the device 5 for operating the steam valve 9 when the control wheel 11 is (see Fig. 13) in a position which may be termed the "starting" position. When the control wheel is in a position which may be termed the "running" position, the distributor 3 is shut off from, and distributor 4 is connected to, and works the operating device 5.

In the case of the distributor 3 the driving shaft 31 is attached to a cylindrical plug 32, Fig. 2, by a coupling 33 of any convenient design. The plug rotates in a liner 34 in which the ports 49, 49<sup>a</sup>, 49<sup>b</sup>, and 49<sup>c</sup>, are cut. The liner may be separate from or formed as a part of the distributor casing. The cylindrical piston valve 35 is fitted in a cylinder 36, formed in the upper portion of the distributor and is reciprocated, as aforesaid, by pressure oil admitted as required at 71 and 72. The plug 32 has two sets of grooves cut in it, one set comprising grooves 37, 38 and 39, and the other set comprising grooves 40, 41 and 42, the former set of grooves control the operation of the steam valve 9 (Fig. 1) when the control wheel 11 (Fig. 1) is in the "starting" position (see Fig. 13). The grooves 40, 41, and 42 control the operation of the exhaust valve 10 (Fig. 1). The grooves are of special formation, as shown.

The groove 37, consists of two portions 37 and 37ª separated from one another as shown in Fig. 3 and the part 37ª is proportioned so as to give a long period of steam admission when starting the engine. The grooves 39, 40, and 42 are formed in a similar fashion.

The oil supply from the pump to this distributor is led by pipe 56 to a longitudinal passage 43, from which it passes by ports 43ª (Fig. 4) to the groove 38 and corresponding ports 43ᵇ to the groove 41. As seen, Fig. 4, the groove 38 is cut all round the plug 32 and so also is groove 41. The transfer ports 44, 45, connect the groove 38 to the grooves 37 and 39 similarly transfer ports 46 and 47 connect the groove 41 to the grooves 40 and 42. With the piston valve 35 in the position shown, the outlet connection 48 is in communication with the groove 37 by means of the port 49 and annulus 62, and is cut off from the port 49ᵇ and groove 39. Similarly the outlet connection 63 is in communication with the groove 40 by annulus 62ª and port 49ª and is cut off from the port 49ᶜ and groove 42.

When the shaft 31 and plug 32 is rotated in the direction shown by the arrow in Fig. 3 or Fig. 4 and the edge 65 of the groove 37ª passes the edge 66 of port 49 (Fig. 3), the oil from the pump 1 and passages 43, 43ª, groove 38 and transfer port 44, passes to the groove 37ª and thence to the port 49 and, by pipe 48, control 7 and pipe 88, to the operating device 5 Fig. 1. This secondary oil moves the valve 9 downwards against the action of the primary pressure in device 5. The valve remains down until the edge 65ª passes the edge 66 of port 49 when the pipe 88 of the valve operating device 5 is put into communication with the central drain passage 67 and drain pipe 60 by means of the groove 37 and the hole 69. The oil pressure in the pipe 88 is thus relieved and the steam valve 9 closes under the action of the primary pressure liquid and remains so until the edge 65 again uncovers edge 66. The same sequence of events follows with the exhaust valve 10 (Fig. 1) the control of the secondary oil supply and exhaust for the device 6 being effected by the groove 40 which is similar to 37 but so disposed with relation to the main engine crank shaft and so proportioned, as shown, that the valve opens and closes at the correct periods. The groove 40 has an opening 69ª to drain 67, a transfer port 46 (similar to 44) and communicating with groove 41 which is in communication by port 43ᵇ (similar to 43ª) with supply passage 43. 47 is a transfer port (similar to 45) from 41 to 42. The grooves 39 and 42 are respectively made similar to 37 and 40 but are so placed as shown, that they operate the valves 9 and 10 (Fig. 1) at the correct periods when the plug 32, is, with reverse drive rotated in the direction opposite to that shown by the arrows at Fig. 3 and Fig. 4 and when the piston valve 35 is moved into its extreme position to the right.

The method of constructing the "running" distributor 4 is similar to that of distributor 3 already described but it is simpler and has only three grooves. The cylindrical plug 15 (Fig. 5) is rotated by the shaft 31, a special type of slip coupling 16, shown in section Fig. 8, being used. The plug 15 rotates in a liner 17 fixed in a casing 18, or if desired, it may be made to rotate directly in the casing. A separate liner 19 is arranged so that its position relative to liner 17 may be altered by several degrees by means of a hand wheel 30, worm 30ª and worm wheel segment 30ᵇ (Fig. 7) or any other suitable method.

In the case of this distributor oil from the pump is brought in by branch 20 from pipe 55 and enters the circular groove 21, in the plug, from which it is transferred to branch 22 and pipe 87 by the transfer port 23. As the plug 15 is rotated, the passage 23 comes in communication with the outlet connection 22 and, if the control wheel 11 is in the correct position, the oil passes by pipe 88 to the operating device 5 for valve 9 which is thus opened and remains so until the oil pressure is relieved by the connection 22 being put in communication with the drain connection 29 through the groove 24, hole 25ª, hole 25, hole 26ª, groove 26 and the hole 28 in the movable liner 19. While therefore the groove 24 uncovers the outlet 22 at a definite point in the revolution the period at which the valve shuts is controlled by the position of the liner 19, which is alterable within certain limits by the hand wheel 30, at will, with the engine either running or stopped.

The connections 48, Fig. 2, and 22, Fig. 5 are led to the operating device 5 through the control 7. Referring to Fig. 12 and to Fig. 1, it will be seen, the connection 48 is divided into control connections 85 and 86, and connection 22 is led to the control connection 87. When the control wheel 11 is in the "stop" position shown in Figs. 12 and 13, the "secondary" connection 88 for the valve operating device 5 is in direct communication with the drain pipe 59 through the port 89 and duct 90 and the valve 9 is therefore, as hereinbefore described, held closed irrespective of the distributors 3 and 4. The engine therefore is stopped. According as the control wheel is turned to right or left, to the positions marked "starting" in Figure 13, the connection 85 or 86 will be brought, by the spaces 92, 93, (these spaces 92, 93, are connected by a cross port 95) of the plug 74 and space 94 (see Fig. 12) into connection with the pipe 88. In this way the groove 37 or 39 of Fig. 2 (according to the direction in which the distributor 3 is running and the position of valve 35) can be connected to the valve operating device 5, and the distributor 3 will thus regulate the operations of the valve 9 when starting, in either direction. When the control wheel 11 is turned further round either to the right or to the left to the "running" position (Fig. 13), the connection 87 from distributor 4 is brought into direct communication with the connection 88 by spaces 92, 93, 95, whilst the connections 86 and 85 are closed. The distributor 4, Fig. 1, will then, as it rotates, regulate the action of the valve operating device 5 and valve 9 whilst the distributor 3 will be cut off from this valve and will merely regulate the valve 10 by the secondary oil supply 63.

It will be thus seen, that, as the control wheel is turned to left or right of "stop," Fig. 13, the upper part (Fig. 11) of valve 7 will first actuate the piston 35 to give "ahead" or "reverse" drive, a further movement will, by the lower part of valve 7 (Fig. 12) enable the distributor 3 to start the engine, in either direction, by its double set of grooves and then, by a further movement the engine can be put into steady running by the co-action of distributors 3 and 4. To stop the engine the wheel 11 is turned back to "stop" position whereupon as shown at Fig. 12, the secondary supply pipe 88 is put into communication with the drain 90.

Referring again to Figs. 5, 6 and 8, in order that the periods of opening and closing the steam valve may be correct when the engine runs in the reverse direction it is necessary to allow the cylindrical plug 15 to lag behind the engine shaft. This can be done by fitting the special coupling 16, shown in section in Fig. 8. The end of the plug 15 is recessed at 15$^a$ as shown and the dog coupling 16 is fixed to the driving shaft 31. The prongs 16$^a$ are proportioned so that the plug 15 will slip behind the shaft 31, by the reversing angle when the shaft is rotated in the opposite direction. The steam valve 9 will thus operate at the correct periods when the running distributor 4 is put into operation after the engine has started "reverse" (or in the case of a marine engine "astern") under the initial control of the starting distributor 3.

It will be recognized that the same methods can be applied to more than one steam or one exhaust valve and to more than one cylinder. Fig. 9 shows a distributor similar to that of Fig. 2, but arranged to control valves for two cylinders set with their cranks at 180 degrees apart, or suitable for a double acting steam cylinder. In this case in addition to the piston valve 35 for the one cylinder there is a second piston valve 35$^a$ for the other cylinder both valves being similar in construction and actuated in a similar manner. The pipes 48, 48$^a$, 63, 63$^a$, are properly connected to the control 7 and the actuating devices 5 and 6 for the steam valves of the two cylinders. The plug 32 is the same as before and has three grooves 37, 38, 39, for the supply and exhaust of liquid for the steam valves of both cylinders and grooves 40, 41, 42, for the supply and exhaust of liquid for the exhaust valves.

For cylinders set with cranks at different angles apart the ports in the liners would be cut at corresponding angles.

Distributors similar in principle to those of Fig. 2 and Fig. 5, but with increased numbers of grooves may be used when more cylinders are fitted.

It is not essential to use a starting distributor 3 in every case. If it be omitted the distributor 4 would be constructed with a duplicate set of ports and grooves and a reversing piston valve similar to 35 in Fig. 2. In this case the shaft 31 would be connected to the plug 15 without any slip device in the coupling. In such a case it might be more convenient to combine the two distributors in one, and this could be done without affecting the principle of the invention. If, in such a case, it were desired to omit the hand regulation of the steam cut off point, the distributor shown in Fig. 2 could be used to operate the steam and the exhaust valves, the grooves 37 and 39 being made to suit the admission and cut off periods required for the running conditions. The control valve would under these circumstances be simplified by the omission of the connections shown in Fig. 12.

Having now fully described my invention what I claim and desire to secure by Letters Patent is:—

1. Valve control gear comprising in combination a valve operating device, a pressure generating device, a distributing device, a device for controlling the action of the distributing device and fluid carrying means operatively connecting the whole of said devices.

2. Valve control gear comprising, in combination, a valve operating device, a pressure generating device, a distributing device, a rotary device for controlling the action of the distributing device and fluid carrying means operatively connecting the whole of said devices.

3. Valve control gear comprising, in combination, a valve operating device, a pressure generating device, a distributing device, a valve for controlling the action of the distributing device and fluid carrying means operatively connecting the latter with the other three devices.

4. Valve control gear comprising, in combination, valve operating means, a pressure generating device in connection therewith, distributing means in connection with the generating device and valve operating means and a controlling device in connection with the pressure generating device, the distributing means and the valve operating means.

5. Valve control gear comprising, in combination, valve operating devices, a pressure generating device in connection therewith, distributing devices in connection with the generating device and valve operating devices and a control valve in operative connection with the generating device, the distributing devices and the valve operating devices.

6. Valve control gear comprising, in combination, valve operating devices, a pressure generating device in connection therewith, distributing devices in connection with the generating device and valve operating devices and a control valve adapted to connect the generating device with a distributing device and both distributing devices with the valve operating devices.

7. Valve control gear comprising, in combination, valve operating devices, a reservoir, a pressure generating device in connection with the reservoir and operating devices, distributing devices in connection with the generating device and valve operating devices and a control valve adapted to connect the generating device with a distributing device and said distributing device with the reservoir and to connect both distributing devices with the valve operating devices.

8. Valve control gear comprising, in combination, valve operating devices, a reservoir, a pressure generating device in connection with the reservoir and operating devices, rotary distributing devices in connection with the generating device and valve operating devices and a manually operable rotary control valve adapted to connect the generating device with a distributing device and said distributing device with the reservoir and to connect both distributing devices with the valve operating devices.

9. Valve control gear comprising, in combination, valve operating devices, a pressure generating device in connection therewith, distributing devices in connection with the generating device and valve operating devices and a control valve having an arrangement of ports and channels therein whereby the generating device can be connected with the valve operating devices through the distributing devices.

10. Valve control gear comprising, in combination, a valve operating device, a pressure generating device, a rotary distributing device, a manually operable device for controlling the action of the distributing device and fluid carrying means operatively connecting the whole of said devices.

11. Valve control gear comprising, in combination, a valve operating device, a continuously acting pump, a rotary distributing device, a manually operable device for controlling the action of the distributing device and fluid carrying means operatively connecting the whole of said devices.

12. Valve control gear comprising, in combination, valve operating devices, a pressure generating device, distributing devices, a device for controlling the action of the distributing devices and fluid carrying means operatively connecting the whole of said devices.

13. Valve control gear comprising in combination a valve operating device, means for maintaining fluid pressure continuously on said device and means for admitting fluid under pressure periodically to said device to operate same against the action of said continuously acting fluid pressure.

14. Valve control gear comprising, in combination, a valve operating device, means for maintaining fluid pressure continuously on said device, a distributor for admitting fluid under pressure periodically to said device to operate same against the action of said continuously acting fluid pressure and means for controlling the action of said distributor.

15. Valve control gear comprising, in combination, a valve operating device consisting of a casing having a differential plunger therein, means for maintaining a constant pressure on one end of said plunger and rotary means for admitting fluid under pressure periodically to the other end of said plunger to operate same against the action of said constant pressure.

16. Valve control gear comprising, in combination, an operating device, means adapted to maintain a constant pressure thereon, a rotary distributor for admitting fluid under pressure periodically to said device to operate same against said constant pressure and means for controlling the operation of said distributor.

17. Valve control gear comprising, in combination, operating devices, means adapted to maintain a constant pressure thereon, rotary distributors for admitting fluid under pressure periodically to said devices to operate same against said constant pressure and means for controlling the operation of said distributors.

18. Valve control gear comprising, in combination, an operating device, means adapted to maintain a constant pressure thereon, a distributor for periodically admitting fluid under pressure to said device to operate same against said constant pressure, a valve adapted to vary the periodicity of the distributor and means for controlling the operation of said valve.

19. Valve control gear comprising, in combination, an operating device, means adapted to maintain a constant pressure thereon, a rotary distributor for periodically admitting fluid under pressure to said device to operate same against said constant pressure, a slide valve adapted to vary the periodicity of the distributor and means for controlling the operation of said valve.

20. Valve control gear comprising, in combination, two operating devices, means adapted to maintain a constant pressure thereon, a distributor for periodically admitting fluid under pressure to both operating devices, a second distributor for periodically admitting fluid under pressure to one of said devices and means for cutting said first mentioned distributor out of operative connection with one of said devices and operatively connecting the second distributor with said device.

21. Valve control gear comprising, in combination, valve operating means, a pressure generating device in connection therewith, distributing means in connection with the generating device, a reversing valve in connection with the distributing means and a controlling device in connection with the pressure generating device, the reversing valve and the valve operating means.

22. Engine control gear comprising, in combination, inlet and exhaust valve operating devices, means for maintaining a constant fluid pressure on said devices and rotary means for supplying fluid under pressure periodically to said devices to operate same against said constant fluid pressure.

23. Engine control gear comprising, in combination, inlet and exhaust valve operating devices, means for maintaining a constant fluid pressure on said devices, rotary means for supplying fluid under pressure periodically to said devices to operate same against said constant fluid pressure and means for varying the periodicity of said latter supply.

24. Valve control gear comprising, in combination, an operating device, means adapted to maintain a constant pressure thereon, a rotary distributor for periodically admitting fluid under pressure to said device to operate same against said constant pressure and means for varying the periodicity of the distributor.

25. Valve control gear comprising, in combination, an operating device, means adapted to maintain a constant fluid pressure thereon, a rotary distributor for periodically admitting fluid under pressure to said device to operate same against said constant pressure and means for varying the periodicity of the distributor.

26. Valve control gear comprising, in combination, two differential operating devices, a pressure generating device in direct connection therewith, two distributors, a reversing valve in connection with one distributor and a control device adapted to connect the generating device first with the reversing valve, then with both operating devices through one distributor and then with both operating devices through both distributors.

In testimony whereof I affix my signature in presence of two witnesses.

ANDREW IRVING NICHOLSON.

Witnesses.
H. D. FITZPATRICK,
MARY GREEN.